Dec. 28, 1965  B. ÅKE LAGERCRANTZ  3,225,417
METHOD OF PRODUCING AN OXIDE FILM CAPACITOR
Filed Oct. 25, 1962
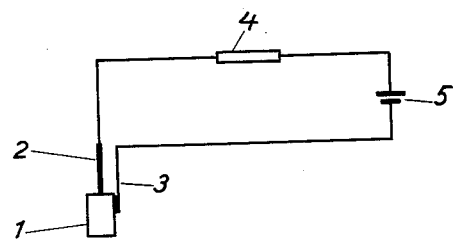
INVENTOR
BENGT ÅKE LAGERCRANTZ
BY Hane and Nydick
ATTORNEYS

United States Patent Office 3,225,417
Patented Dec. 28, 1965

3,225,417
METHOD OF PRODUCING AN OXIDE FILM CAPACITOR
Bengt Åke Lagercrantz, Stocksund, Sweden, assignor to Telefonaktiebolaget L M Ericsson, Stockholm, Sweden, a corporation of Sweden
Filed Oct. 25, 1962, Ser. No. 232,976
Claims priority, application Sweden Nov. 10, 1961
3 Claims. (Cl. 29—25.31)

The present invention concerns a method of producing an oxide film capacitor, i.e., a capacitor using as in electrolytic capacitors, the thin dielectric oxide layer producible by means of an electrolytic procedure on the surface of certain metals, such as tantalum, aluminum and others. Such a metal is used for one of the electrodes, and in the electrolytic capacitor the other electrode consists of the electrolyte, while in the oxide film capacitor referred to, the other electrode consists of a semiconducting oxide of lead, manganese or nickel.

In a known method a porous body, consisting of compressed particles of the film-forming metal is used for the first-mentioned electrode. The porous body is anodized in an adequate electrolyte for producing the dielectric oxide layer. Thereafter, the body is immersed in a solution of a salt that is transformable to such an oxide, for instance, manganese nitrate. The coating of manganese nitrate thereby obtained on the body is transformed by pyrolysis at a temperature of about 200°–300° C. to manganese dioxide. The immersion in a solution of manganese nitrate and the transformation of the nitrate to dioxide by this heat treatment is repeated twice or thrice in order to produce an oxide layer of sufficient thickness.

At the high temperatures used during the pyrolytic process, however, defects result in the dielectric oxide layer. Therefore, repeated anodizing has to be carried out, specially as otherwise the leakage current of the finished capacitor will not be within acceptable value. After this anodizing an additional coating of manganese dioxide is provided in the manner described above.

Finally, the body is provided with a conducting layer to which the negative terminal is to be connected. To this end it is immersed in an aqueous suspension of graphite, on to which, after drying, a metal coating is provided. The known procedure has the big disadvantage that the anodizing has to be repeated. The anodizing is a time-consuming process and the removal of the electrolyte from the body is troublesome, specially as the electrolyte consists of a melted salt.

The invention refers to an improvement of this procedure, and by the invention the repetition of the anodizing is made unnecessary. This is achieved by applying at least during a limited time interval of the pyrolytic process, a voltage between the body and the salt coating by means of an auxiliary electrode that is arranged to make electric contact with said coating.

The auxiliary electrode may consist of tantalum or some other indifferent metal. The electrode is so mounted that before the first heat treatment it is located close to the porous metal body without making contact with the same. Provided the auxiliary electrode is located sufficiently close to the porous body, the space therebetween will be bridged over by manganese dioxide during said first heat treatment. The voltage connected between the body and the auxiliary electrode ought to be of the same polarity as the voltage used during the anodization, but should be of a lower value. A convenient value is that of the working voltage of the finished capacitor.

The voltage is usually applied during the entire heat treatment. Thereby, an anodizing of the porous body occurs simultaneously with the transformation of the nitrate to dioxide during the heat treatment, whereby the anodization heals the appearing defects of the dielectric layer. It is also advantageous to let the voltage remain applied even during the drying of the graphite coating, because lower leakage current values are obtained as a result thereof.

In certain cases it may be more convenient to have the voltage connected only during one or a few of the heat treatments, or even only during a limited time of the heat treatment.

The method is also usable for the production of capacitors in which other forms of electrodes than sintered porous bodies, such as wires or foils, are used.

On the accompanying drawing the way of connecting the auxiliary electrode is shown. A porous metal body 1 is provided with a connection terminal 2. An auxiliary electrode 3 that is provided with a coating of manganese dioxide, is placed close to the anodized surface of the metal body. A current source 5 is connected in series with a resistance 4 between the auxiliary electrode 5 and the terminal 2.

During the manufacture of a capacitor having a tantalum electrode, said electrode was anodized during a time of two hours using a voltage of 20 v. Thereafter a total of five heat treatments for producing the manganese dioxide were carried out at a temperature of 230° C. with a voltage of 8 v. applied between the tantalum electrode and the auxiliary electrode. The finished capacitor had a capacitance of .22 μf. and a leakage current of .03 μa. at a voltage of 8 v.

I claim:
1. A process for producing a solid state capacitor having an electrolytic valve-forming electrode, said process comprising the steps of providing an electrode in the form of a porous metal body electrolytically anodizing said electrode by means of an anodizing voltage to form thereon a dielectric oxide layer, then coating said electrode with a semiconducting oxide by applying to the electrode successive layers of a solution of a salt convertible by pyrolysis to said semiconducting oxide, then transforming each of said layers of salt to a semiconducting state by subjecting the respective layer to pyrolytic action for a period of time while simultaneously applying an auxiliary anodizing voltage between the electrode and the respective layer for at least part of the period of pyrolytic action by means of an auxiliary electrode in contact with the respective layer of salt for continuously and immediately sealing pinholes forming in the dielectric layer by the pyrolytic action, then coating the electrode additionally with a layer of graphite, and finally covering said graphite layer with an outer metal coating.

2. The process according to claim 1 and comprising the step of applying between the electrode and the respective layer of salt an auxiliary voltage which has the same polarity as the anodizing voltage but is lower than said voltage.

3. The process according to claim 1, wherein said graphite covering is applied by temporarily submerging the electrode in a solution of graphite and then drying the electrode and the graphite thereon while maintaining said auxiliary voltage during the drying step.

References Cited by the Examiner
UNITED STATES PATENTS
2,936,514   5/1960   Millard _____ 29—25.31

RICHARD H. EANES, JR., *Primary Examiner.*